United States Patent
Svedberg

(10) Patent No.: US 8,804,519 B2
(45) Date of Patent: Aug. 12, 2014

(54) METHOD FOR TEMPORAL ADMISSION CONTROL IN A DIGITAL VIDEO NETWORK

(75) Inventor: Johan Svedberg, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 424 days.

(21) Appl. No.: 13/259,971

(22) PCT Filed: Mar. 25, 2009

(86) PCT No.: PCT/SE2009/050312
§ 371 (c)(1), (2), (4) Date: Sep. 26, 2011

(87) PCT Pub. No.: WO2010/110707
PCT Pub. Date: Sep. 30, 2010

(65) Prior Publication Data
US 2012/0014255 A1    Jan. 19, 2012

(51) Int. Cl.
G08C 15/00 (2006.01)
H04L 12/56 (2006.01)
H04W 28/26 (2009.01)

(52) U.S. Cl.
CPC ............. H04L 47/10 (2013.01); H04W 28/26 (2013.01)
USPC ........................................................ 370/235

(58) Field of Classification Search
CPC ......... H04L 47/10; H04L 47/14; H04L 12/54; H04W 28/26
USPC ............. 370/229, 230, 231, 235, 351, 389, 370/395.1, 395.4, 395.41, 431, 442, 443, 370/464, 465, 468; 709/230, 231; 725/25, 725/27, 86, 87, 91, 93, 95
See application file for complete search history.

(56) References Cited

U.S. PATENT DOCUMENTS

| | | | |
|---|---|---|---|
| 6,941,141 B2 | 9/2005 | Park et al. | |
| 7,921,348 B2 | 4/2011 | Seidel et al. | |
| 2006/0064729 A1 | 3/2006 | Steading | |
| 2007/0081459 A1* | 4/2007 | Segel et al. | 370/230 |
| 2007/0133603 A1 | 6/2007 | Weaver et al. | |
| 2008/0115167 A1* | 5/2008 | Hermsmeyer et al. | 725/46 |
| 2008/0253347 A1 | 10/2008 | Cordeiro et al. | |
| 2008/0259846 A1 | 10/2008 | Gonikberg et al. | |
| 2008/0279264 A1 | 11/2008 | Desai et al. | |
| 2008/0285936 A1 | 11/2008 | Yampanis et al. | |
| 2009/0060028 A1 | 3/2009 | Liu et al. | |
| 2009/0135776 A1* | 5/2009 | Sashihara | 370/329 |

FOREIGN PATENT DOCUMENTS

| | | |
|---|---|---|
| EP | 1802046 A1 | 6/2007 |
| RU | 2006107917 A | 9/2007 |
| WO | 02/087153 A2 | 10/2002 |

* cited by examiner

*Primary Examiner* — Obaidul Huq
(74) *Attorney, Agent, or Firm* — Coats and Bennett, P.L.L.C.

(57) ABSTRACT

Where a restricted channel links a subscriber location and an access node of a digital video network, a bandwidth allocation server may receive a bandwidth reservation request to reserve bandwidth on the restricted channel that includes a reservation start time. The bandwidth allocation server can obtain any existing bandwidth reservations for bandwidth on the restricted channel at least partly covered by the duration of the reservation request (the duration being delimited by the reservation start time), and determine whether a bandwidth limit is exceeded by a combination of the bandwidth reservation request and any existing bandwidth reservations, at any time covered by the bandwidth reservation request. When it is determined that the combination is under the bandwidth limit, a reservation accept response can be sent and a reservation can be stored. Otherwise, a reservation reject response can be sent.

20 Claims, 9 Drawing Sheets

METHOD FOR TEMPORAL ADMISSION CONTROL IN A DIGITAL VIDEO NETWORK

TECHNICAL FIELD

The invention relates generally to digital video networks, and more particularly to bandwidth control in digital video networks.

BACKGROUND

In networks designed to deliver services like voice over IP (Internet Protocol), television and video, the network often includes a way to ensure that the service data can be delivered on time. One option to address this issue is to provision the network with enough capacity such that congestion never (or very seldom) occurs. Another option is to provide an admission control mechanism to reduce the risk of networks getting congested.

Often it is the link closes to the user equipment, between the user equipment and the first network node, commonly denoted the first (or last) mile, which presents the largest bandwidth issues. One way of reducing the bandwidth issues is to use equipment limitation, e.g. limit the number of set top boxes a user may have installed.

Admission control can be implemented with policy servers that know the network topology in terms of congestion points. The policy server checks that the congestion points along the delivery path have free resources. If so the resources of the congestion point are reserved and the admission is granted. Otherwise admission is rejected. When the client does not use the resources any longer it returns the bandwidth resources to the policy server.

Set top boxes (STBs) in many cases include the capability to record broadcast content; this is referred to a personal video recorder (PVR). Such STBs can also be provided with multiple tuners to allow recording of one channel while simultaneously live watching of another channel. Scheduled recordings together with live television watching, for potentially multiple STBs in one home, sharing the same first mile capacity, putting strain on the restricted resource which may cause congestion and even service disruption.

This may lead to end user frustration and complaints, causing IPTV operators to be reluctant to allow deployment of multiple STBs, or even multi-tuner STBs in one home.

SUMMARY

An object of the invention is to provide improved bandwidth allocation, reducing the risk of congestion in a digital video network.

According to a first aspect of the invention, it is presented a method for bandwidth allocation in a bandwidth allocation server of a digital video network, the digital video network comprising a restricted channel being a link between a subscriber location and an access node. The method comprises the steps of: receiving a bandwidth reservation request to reserve bandwidth on the restricted channel, the bandwidth reservation request comprising a reservation start time; obtaining any existing bandwidth reservations for bandwidth on the restricted channel at least partly covered by the duration of the reservation request, the duration being delimited by the reservation start time; determining whether a bandwidth limit is exceeded by a combination of the bandwidth reservation request and the any existing bandwidth reservations, at any time covered by the bandwidth reservation request; when it is determined that the combination is under the bandwidth limit, handling an acceptance by sending a reservation accept response and storing a reservation corresponding to the bandwidth reservation request; and when it is determined that the combination exceeds the bandwidth limit, handling a rejection by sending a reservation reject response.

By including temporal information in the bandwidth reservation request, it is possible not only to schedule reservations, but it also allows for a flexible and secure way to reserve and consume bandwidth in a system with a plurality of receivers even within one home. The invention thus resolves bandwidth issues being a consequence of deploying STBs to an extent that in worst case uses more capacity than is available, e.g. in the first mile. IPTV operators can deploy more STBs per home which makes the service more attractive, increasing the number of end users that can be targeted with the service offering. By allowing this flexibility, the bandwidth can be used more efficiently. Moreover, using the reject response, the receiver can interface with the user to possibly modify the request and/or existing reservations.

In the step of receiving the bandwidth reservation request may further comprise a reservation end time. Including both start time and end time e.g. allows for reservations for PVR recordings. It is to be noted that no end time is necessary for open ended live television watching.

The bandwidth limit may be a bandwidth limit for internet protocol television.

The bandwidth limit may be a bandwidth limit for a single internet protocol television subscriber. In other words, the bandwidth limit may be for one home, also known as the first mile.

The reservation reject response may contain references to at least one of the any existing bandwidth reservations. This enables the user to select whether to delete any of the already existing conflicting reservations. Optionally, this can be performed automatically according to predefined rules.

The method may further comprise the step of when it is determined that the combination exceeds the bandwidth limit only for part of the time covered by the bandwidth reservation request, handling a partial accept by sending a partial reservation accept response comprising at least one time interval when the combination is under the bandwidth limit. By using partial accept responses, the receiver can interface with the user to possibly modify the request and/or existing reservations, further increasing efficient bandwidth usage.

The partial accept response may contain references to at least one of the any existing bandwidth reservations.

The bandwidth reservation request may comprise a numerical value of requested bandwidth. For example, the bandwidth reservation request may include a reservation bandwidth in megabits per second.

A second aspect of the invention is a bandwidth allocation server for bandwidth allocation in a bandwidth allocation server of a digital video network, the digital video network comprising a restricted channel being a link between a subscriber location and an access node. The bandwidth allocation server comprises: a request receiver configured to receive a bandwidth reservation request to reserve bandwidth on a restricted channel, the bandwidth reservation request comprising a reservation start time; a reservation reader configured to read any existing bandwidth reservations for bandwidth on the restricted channel at least partly covered by the duration of the reservation request, the duration being delimited by the reservation start time; a comparator configured to determine whether a bandwidth limit is exceeded by a combination of the bandwidth reservation request and the any existing bandwidth reservations, at any time covered by the bandwidth reservation request; a transmitter configured to send a reservation accept response when it is determined that the combination is under the bandwidth limit, and to send a reservation reject response when it is determined that the combination exceeds the bandwidth limit.

The bandwidth allocation server may be comprised in a policy server; the request receiver may be configured to receive the bandwidth reservation request from an application server, the application server being configured to serve requests from receivers; and the transmitter may be configured to send responses to the application server.

The bandwidth allocation server may be is comprised in combined policy and application server, wherein the policy and application server is configured for bandwidth allocation and to serve requests from receivers; the request receiver may be configured to receive the bandwidth reservation request from a receiver; and the transmitter may be configured to send responses to the receiver.

A third aspect of the invention is a method for reserving bandwidth in a digital video network, the digital video network comprising a restricted channel being a link between a subscriber location and an access node in a digital video network. The method comprises the steps of: sending a bandwidth reservation request to reserve bandwidth on a restricted channel, the bandwidth reservation request comprising a reservation start time; receiving a reservation accept response when it is determined that a combination of the bandwidth reservation request and any existing bandwidth reservations is under a bandwidth limit; and receiving a reservation reject response when it is determined that the combination exceeds the bandwidth limit. Using this method, bandwidth can be reserved from a specific start time, e.g. from a receiver.

The bandwidth reservation request may comprise a numerical value of requested bandwidth.

The reservation reject response may contain references to at least one of the any existing bandwidth reservations.

The method may further comprise the step of receiving a partial reservation accept response when it is determined that the combination exceeds the bandwidth limit only for part of the time covered by the bandwidth reservation request, the partial reservation accept response comprising at least one time interval when the combination is under the bandwidth limit.

The partial accept response may contain references to at least one of the any existing bandwidth reservations.

The method may be started when a user switches channel from a television channel with a relatively low bandwidth to a television channel with a relatively high bandwidth.

A fourth aspect of the invention is an apparatus for reserving bandwidth in a digital video network. The apparatus comprises a transmitter configured to send a bandwidth reservation request to reserve bandwidth on a restricted channel, the bandwidth reservation request comprising a reservation start time; and a response receiver configured to receive a reservation accept response when it is determined that a combination of the bandwidth reservation request and any existing bandwidth reservations is under the bandwidth limit, and to receive a reservation reject response when it is determined that the combination exceeds the bandwidth limit.

A fifth aspect of the invention is a set top box comprising the apparatus according to the fourth aspect.

A sixth aspect of the invention is a television set comprising the apparatus according to the fourth aspect.

It is to be noted that any feature of the first, second, third, fourth, fifth and sixth aspects may, where appropriate, be applied to any other aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
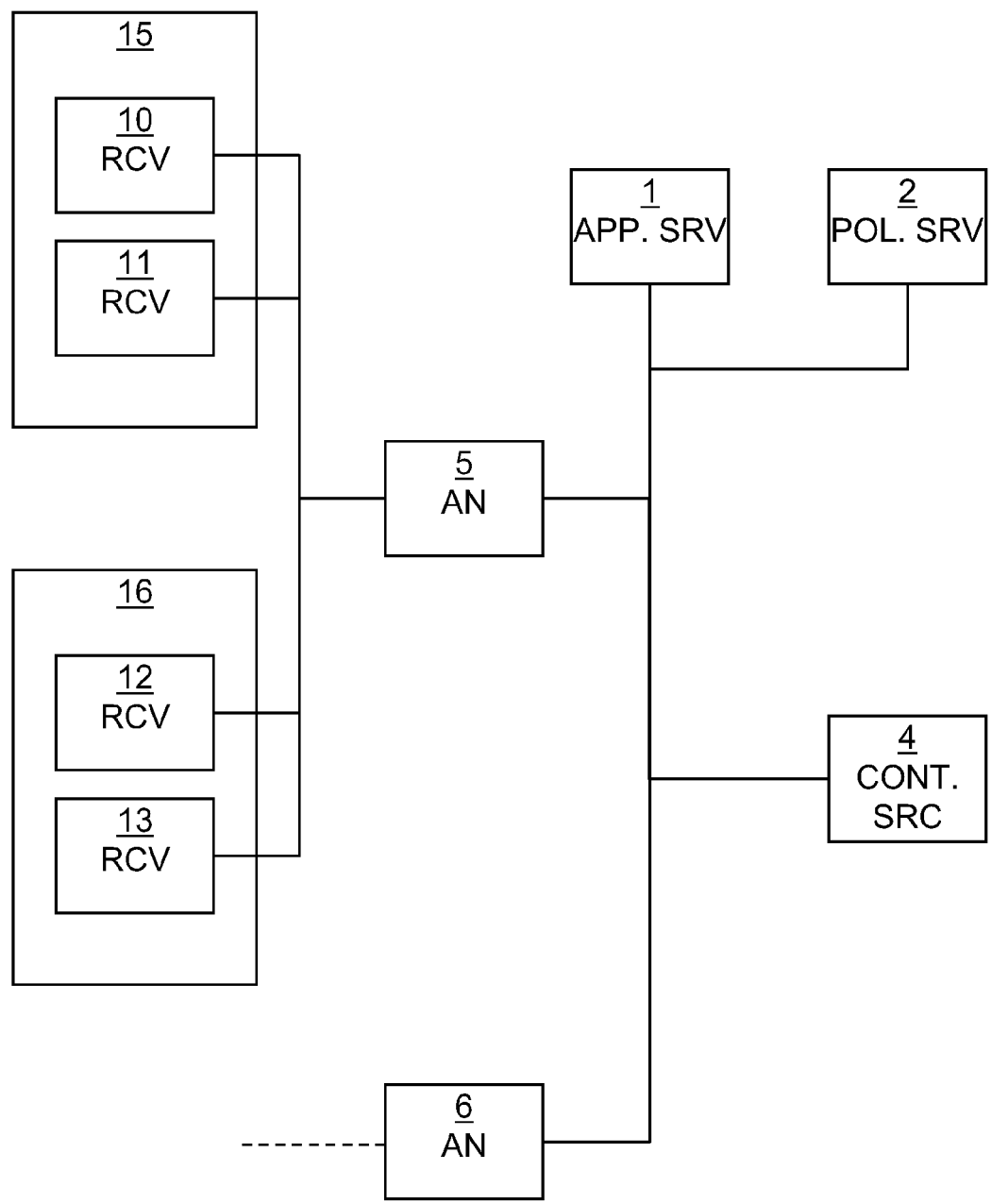
FIG. 1 is a schematic diagram showing an overview of an Internet protocol television (IPTV) environment where an embodiment of the invention can be applied.

FIG. 1 is a schematic diagram showing an overview of an Internet protocol television (IPTV) environment where an embodiment of the invention can be applied. Subscriber homes 15 and 16 have receivers 10-13, such as set top boxes (STBs) or receivers integrated in television sets. Subscriber home 15 has two receivers 10, 11 installed and subscriber home 16 has two receivers 12, 13 installed. Each of these receivers 10-13 is connected via an IP (Internet protocol) network to an access node 5. The access node is in turn connected, directly or indirectly, to content service 4, an application server 1, and a policy server 2. A second access node 6 is connected analogously to the first access node 5, where the second access node serves a separate set of subscribers. Further access nodes are provided as necessary to achieve desired network capacity. Other components of the environment are excluded here in order not to obscure the disclosure of embodiments of the present invention.

The application server 1 and the policy server 2 can optionally be combined in one server, or provided separately as indicated in FIG. 1. Furthermore, the application server 1 and/or the policy server 2 can be implemented using several devices to achieve redundancy and/or performance enhancements. The policy server is responsible for bandwidth allocation. The application server 1 communicates with the receivers 10-13 to provide centralised processing as desired. In other words, the application server 1 serves requests from the receivers 10-13, performs necessary processing and provides the result back to the receivers 10-13 in a response.

The content service 4 provides content to the receivers 10-13 via the access node 5. The content includes video content, audio content and/or text content such as subtitles. Of these materials, the video content requires the most bandwidth. As an example, a high definition stream including both video, audio and optionally text content can use 8-12 Mbps (megabits per second). A standard definition stream including video, audio and optionally text content can use 2-4 Mbps. The bitrates can vary significantly due to what compression algorithm is used and compression configuration, where selected configuration parameters reflect the trade-off relationship between low bitrate and high quality for a given compression algorithm.

There is some flexibility in deciding how much processing is to be performed in the receivers 10-13 and in the application server 1. At one end of the spectrum, hardly any processing is performed in the receivers 10-13. The receivers 10-13 can for example be provided with HTML (hypertext markup language) web browsers which interface with a web server on the application server 1. The receivers 10-13 are in this example a simple user interface to the application server. At the other end of the spectrum, the receivers 10-13 are provided with thick clients with elaborate application specific functionality. Somewhere in between would be when the receivers 10-13 are more advanced browsers with support for JavaScript/ECMAScript or Adobe Flash to achieve a richer user interface. The code is still provided by the application server just like in the pure HTML case, but more execution is performed with the receivers 10-13. Java applets or applications can also be used to execute client code on the devices 10-13, interfacing with the application server 1. Hereinafter, thin clients refer to the case where the devices 10-13 are provided with browsers to access processing performed by the application server 1. It is also to be noted that even in the case of thick clients, the applications on the receivers 10-13 interface with the application server and there is a choice of how much processing to place in the thick client of the receivers 10-13 and the application server, respectively.

Figure 2:
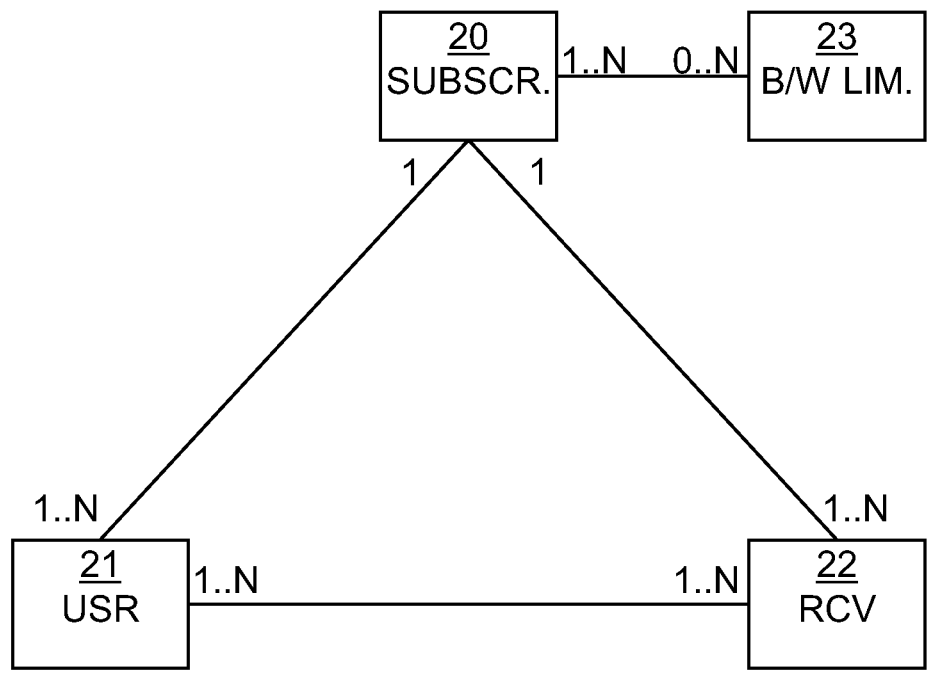
FIG. 2 is an exemplary entity relationship diagram illustrating the separation of subscriber, user, receiver and bandwidth limitations.

FIG. 2 is an exemplary entity relationship diagram illustrating the separation of subscriber 20, user 21, receiver 22 and bandwidth limitations 23. The diagram comprises the subscriber entity 20, the user entity 21, the receiver entity 22 and the bandwidth limitation entity 23.

The bandwidth limitation entity 23 represents a limited bandwidth on a restricted channel For example, the restricted channel can be the connection between an access point and a subscriber home, which many times is a bottleneck in a system such as the system illustrated in FIG. 1. Alternatively or additionally, the bandwidth limitation 23 can represent bottlenecks higher up in the system, closer to central components such as the content service 4 of FIG. 1.

The subscriber 20 entity represents one account in the system and typically corresponds to one subscriber home (see 15, 16 in FIG. 1). In embodiments of the present invention, each subscriber 20 is limited by zero or more bandwidth limitations 23 and each bandwidth limitation 23 affects one or more subscribers 20.

The receiver 22 represents one receiver capable of receiving content over the restricted channel(s) e.g. a set top box or a receiver integrated in a television set. Each subscriber 20 has at least one receiver 22, but may have more receivers.

A user 21 is a person consuming the content of the receiver 22. Each user 21 can use one or more receivers 22 and each receiver can be used by one or more users. Furthermore, each subscriber 20 is coupled to one or more users 21.

FIGS. 3a-d are graphs representing different scenarios of bandwidth reservations in the system of FIG. 1. The horizontal axis represents time, here between 12.00 and 17.00. The vertical axis represents bandwidth usage of one restricted channel, where a line 59 indicates a bandwidth limit on the restricted channel. In this example, a standard definition channel occupies one bandwidth unit and a high definition channel occupies three bandwidth units. A bandwidth unit can for example be 4 Mbps, thereby resulting in standard definition channels of up to 4 Mbps and high definition channels of up to 12 Mbps. It is to be noted that these limits are selected only for the purposes of illustration and that any suitable limits can be chosen for embodiments of the present invention. Bandwidth reservations are represented with rectangles in the grid. Bandwidth reservations can have defined start times and end times or they can be open ended, i.e. without a defined end time. A reservation with defined start and end times can for example be a reservation for a recording using a personal video recorder (PVR) or a reservation for a particular television program to watch. An open ended reservation typically represents casual television viewing. It is to be noted that if a casual viewer selects a channel with different bandwidth, such as going from a standard definition channel to a high definition channel, a new bandwidth reservation and a bandwidth reservation release is sent. The method for handling bandwidth reservation will be explained in detail below.

As is illustrated in FIGS. 3a-d, by including temporal information in the bandwidth reservation request, it is possible not only to schedule reservations, but this also allows for a flexible and secure way to reserve and consume bandwidth in a system with a plurality of receivers even within one home. Consequently, bandwidth issues due to deploying STBs to an extent that in worst case uses more capacity than is available, e.g. in the first mile are resolved. IPTV operators can thus deploy more STBs per home which makes the service more attractive, increasing the number of end users that can be targeted with the service offering. By allowing this flexibility, the bandwidth can be used more efficiently. Moreover, using the reject response, the receiver can interface with the user to possibly modify the request and/or existing reservations.

Figure 3A:
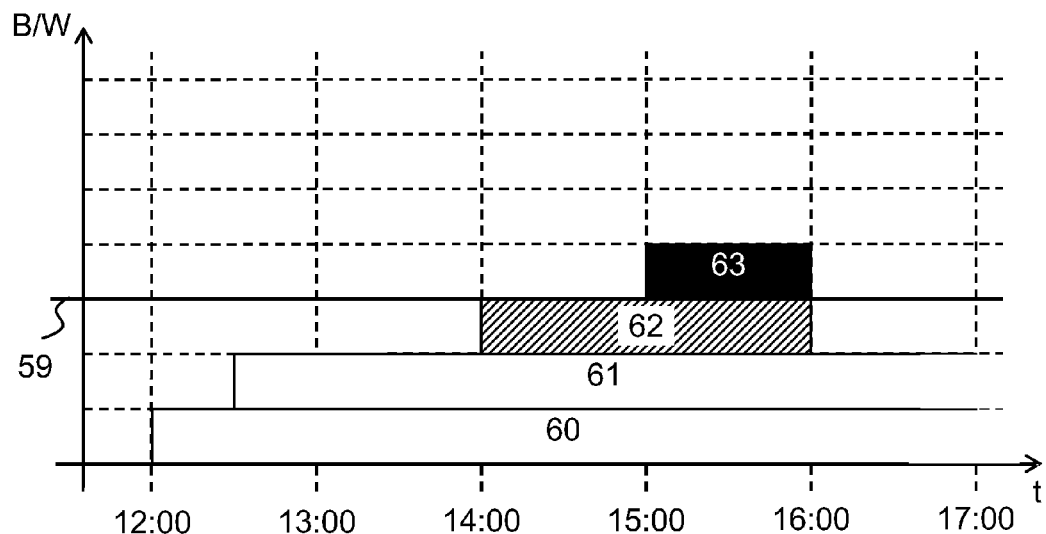
FIGS. 3a-d are graphs representing different scenarios of bandwidth reservations in the system of FIG. 1.

In FIG. 3a, there are two bandwidth reservations 60, 61 already in place. One bandwidth reservation 60 concerns an open ended standard definition channel started at 12:00 without a defined end time. A second bandwidth reservation 61 concerns an open ended standard definition channel where the reservation has a start time of 12:30.

If now a user would like to reserve bandwidth, e.g. for a PVR recording between 14:00 and 16:00, a request for a third bandwidth reservation 62 would be sent from the receiver to the application server (1 in FIG. 1) from a receiver (e.g. 10 in FIG. 1). Since the bandwidth limit 59 would not be exceeded by a combination of the existing bandwidth reservations 60, 61 and the third bandwidth reservation 62, the request can be accepted and the bandwidth reservation 62 is saved.

However, if subsequently a request for a fourth bandwidth reservation 63 is received in the application server, a combination of the request for the fourth bandwidth reservation 63 and the existing bandwidth reservations 60-62 would exceed the bandwidth limit 59. Hence the request for the fourth bandwidth reservation 63 is rejected.

Figure 3B:
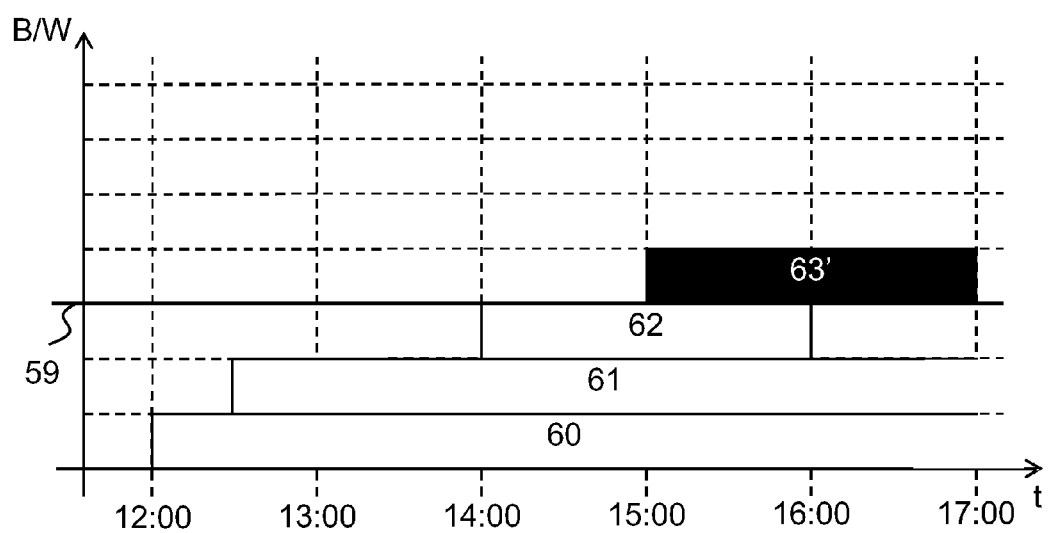

In FIG. 3b, a similar situation is shown. However, here the request for the fourth bandwidth reservation 63' concerns the time between 15:00 and 17:00. In this time, the bandwidth limit would be exceeded between 15:00 and 16:00, but not between 16:00 and 17:00. The application server can then optionally send a partial reservation accept response. The receiver can then prompt the user of what to do, e.g. modify the reservation 63' to cover 16:00 to 17:00, delete one of the existing bandwidth reservation 60-62 or to withdraw the request for bandwidth reservation 63'. As explained above with reference to FIG. 1, depending on the system architecture choice of where to place application logic in the system, the processing within the system to prompt the user how to solve the conflict can performed mainly in the application server 1 or the receiver 10-13. Optionally, the application server sends a reservation reject response like the response sent for the situation in FIG. 3a for the request for the bandwidth reservation 63.

Figure 3C:
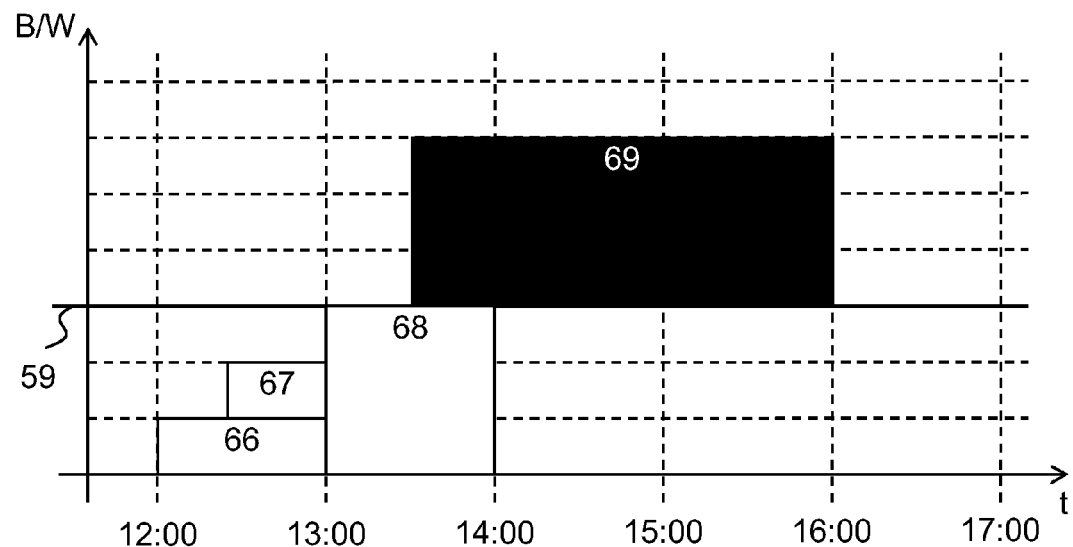

In FIG. 3c, there are three existing bandwidth reservations 66-68 when a request for a fourth bandwidth reservation 69 is received. The reservations 66, 67 are currently pending live television viewing reservations. The application server rejects the request or can optionally send a partial reservation accept response, indicating that a reservation can be accepted for reservations after 14.00. The receiver can then prompt the user of what to do. Optionally, the rejection response or the partial reservation accept response contains references to the existing conflicting reservations, whereby the user can be given the opportunity to modify or delete any of the conflicting reservations.

Figure 3D:
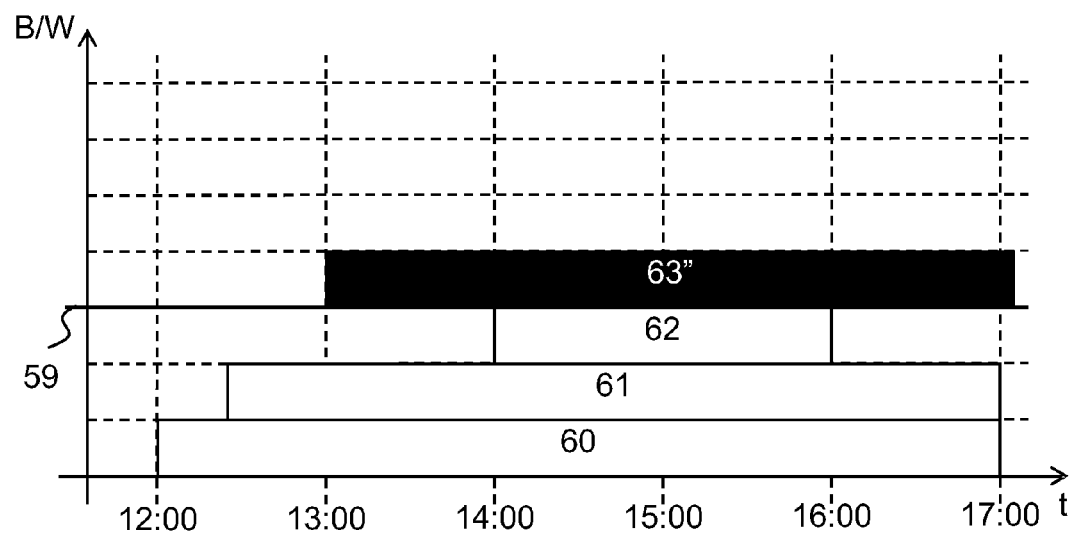

In FIG. 3d, there are three existing bandwidth reservations 60-62 when a request for a open ended fourth bandwidth reservation 63" is received. The situation is similar to that of FIG. 3b, whereby the application server can send a partial reservation accept response, indicating that a reservation can be accepted for reservations until 14.00. The situation can be solved e.g. by cancelling any of the reservations 60-62, or allowing the open ended fourth bandwidth reservation 63" to continue until just before 14:00, and giving the user a choice at that time what bandwidth reservation to reject (or simply ending the reservation 63" automatically at that time). Optionally, if any of the existing bandwidth reservations 60-62 are coupled to a the same receiver as the request for the fourth bandwidth reservation 63", the user can is given the choice between the bandwidth reservations for that particular receiver. Optionally, a reject response can be sent from the application server in response to the fourth bandwidth reservation request 63".

Figure 4:
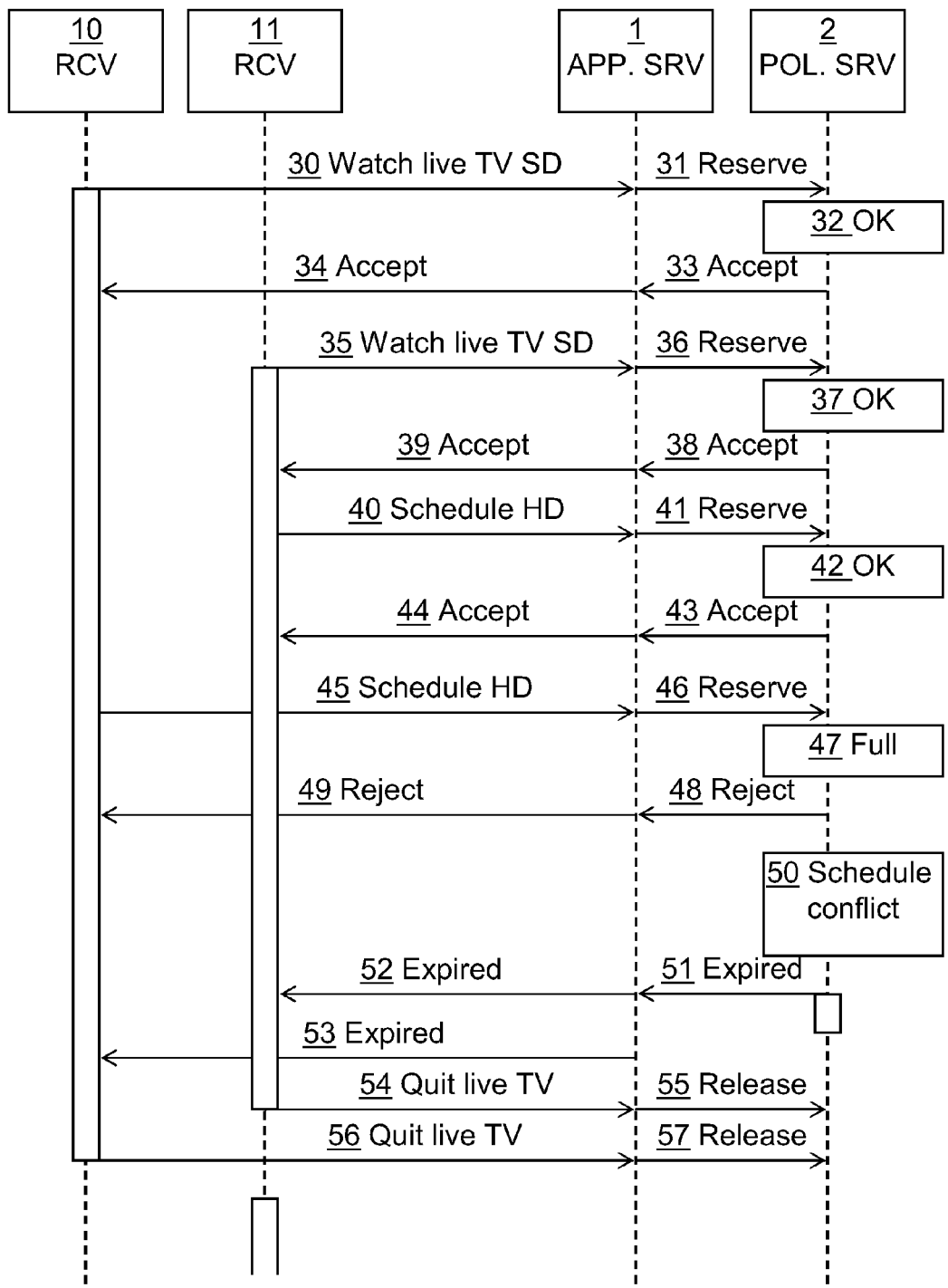
FIG. 4 is a sequence diagram illustrating the communication between receivers relating to the same restricted channel, the application server and the policy server.

FIG. 4 is a sequence diagram illustrating the communication between receivers 10, 11, the application server 1 and the policy server 2. The receivers 10, 11 use the same restricted channel. The text below will refer to both FIG. 4 and FIG. 3c, since both illustrate the same scenario from different perspectives. It is to be noted that as explained above with reference to FIG. 1, depending on the system architecture choice of where to place application logic in the system, more or less processing can be performed in the application server or the receivers 10, 11, respectively.

At about 12:00, a first user of the receiver 10 would like to watch live television, whereby a request 30 for an open ended bandwidth reservation 66 is sent from the receiver 10 to the application server 1. The application server 1 sends a corresponding reserve request 31 to the policy server 2. The policy server 2 determines that the request is OK 32, since there are no previous bandwidth reservations, and sends an accept response 33 to the application server 1 which sends an accept response 34 to the receiver 10.

A little later, around 12:30, a second user of receiver 11 would also like to watch live television, whereby a request 35 for an open ended bandwidth reservation 67 is sent from the receiver 11 to the application server 1. The application server 1 sends a corresponding reserve request 36 to the policy server 2. The policy server 2 determines that the request is OK 37 and sends an accept response 38 to the application server 1 which sends an accept response 39 to the receiver 11.

The second user of receiver 11 would then like to schedule a high definition recording on the PVR, whereby a request 40 for a bandwidth reservation 68 for 13:00 to 14:00 is sent from the receiver 11 to the application server 1. The application server 1 sends a corresponding reserve request 41 to the policy server 2. The policy server 2 determines that the request is OK 42, since the two existing reservations 66, 67 are open ended, and sends an accept response 43 to the application server 1 which sends an accept response 44 to the receiver 11. In other words, in this embodiment, scheduled reservations (with both start and end times) have a higher priority than casual television watching. Optionally, there is no such priority for scheduled reservations with both start and end times, whereby any existing reservation have priority over new reservation requests.

The first user of receiver 10 would then also like to schedule a high definition recording on the PVR, whereby a request 45 for a bandwidth reservation 69 for 13:30 to 16:00 is sent from the receiver 10 to the application server 1. The application server 1 sends a corresponding reserve request 46 to the policy server 2. The policy server 2 determines that the restricted channel is full 47 and sends a rejection response 48 to the application server 1 which sends a reject response 49 to the receiver 10. Optionally, the function of the response 49 can be fulfilled using a partial accept response as explained above. The reject response or the partial accept response can optionally contain references to any conflicting reservations. In this example, the references can be references to bandwidth reservations 60 and 61 or bandwidth reservations 60, 61 and 62.

At a time just prior to 13:00, e.g. at 12:58, since both open ended bandwidth reservations 66, 67 are still valid, the policy server notes that there is a schedule conflict 50 due to there not being sufficient bandwidth for all reservations. An expired message 51 is sent to the application server 1. The application server then sends corresponding expired messages 52, 11 is sent to the two receivers 10, 11, respectively. The two receivers 10, 11 can then automatically, or after user prompting and acceptance, end television viewing. This processing can occur by the receivers 10, 11 in the case of thick clients or this processing can occur in the application server 1 with the receivers 10, 11 being mere user agents, in the case of thin clients. The two receivers 10, 11 then send quit live television messages 54, 56, respectively, to the application server 1, whereby the application server 1 sends corresponding release messages 55, 57 to the policy server. The two bandwidth reservations 66, 67 are thus released and the integrity of the bandwidth reservation 68 for the high definition PVR recording is ensured.

It is to be noted that the application server 1 and the policy server 2 can optionally be combined in one server.

Figure 5:
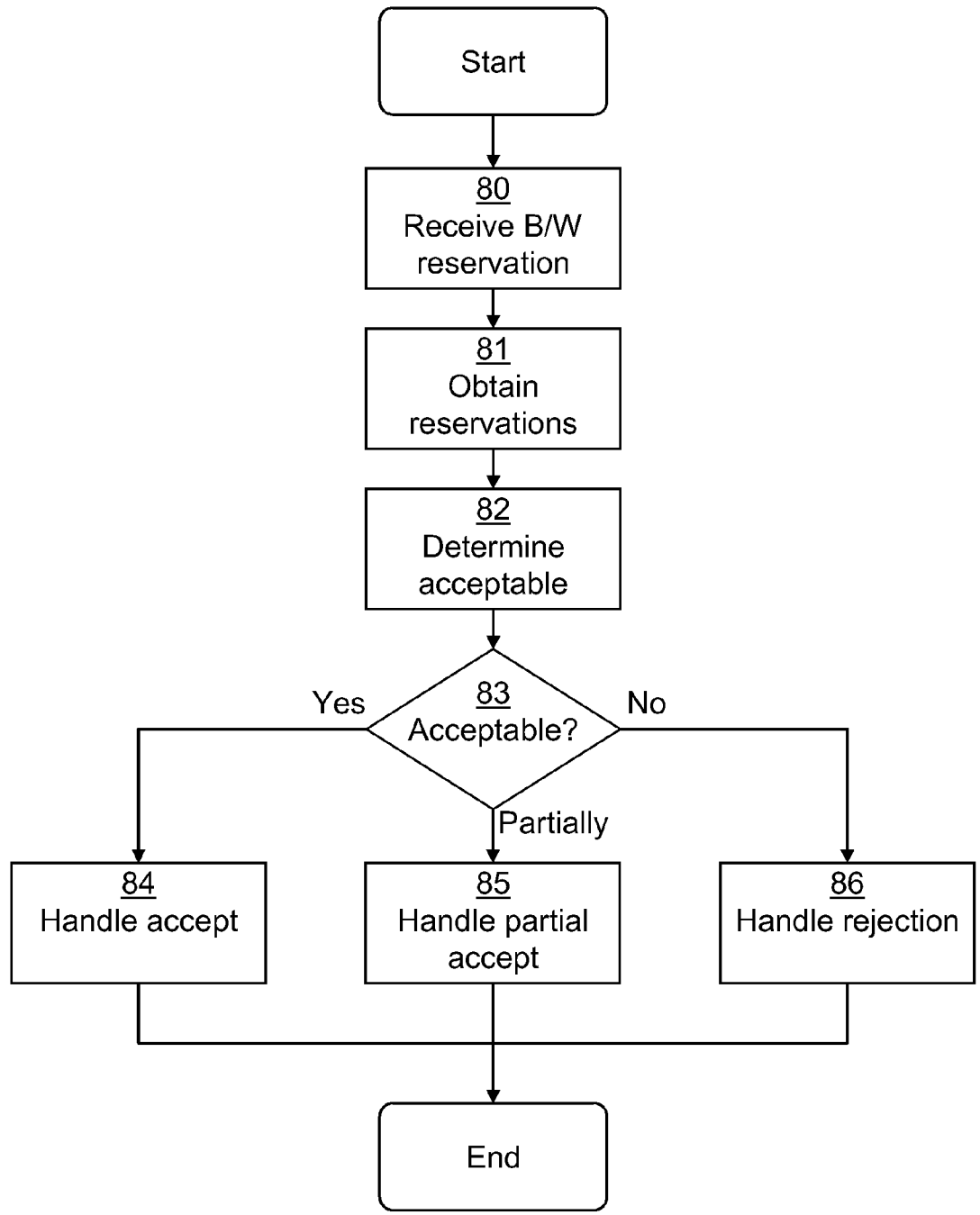
FIG. 5 is a flow chart illustrating a method according to one embodiment being deployed in the application server and/or policy server of FIG. 1.

FIG. 5 is a flow chart illustrating a method in the application server and/or policy server, hereinafter denoted server. The method relates to one restricted channel, but is typically performed for several restricted channels in parallel, e.g. several first mile restrictions in parallel.

In an initial receive bandwidth reservation step 80, the server receives a bandwidth reservation request from a receiver, e.g. receiver 10 of FIG. 1. The request contains at least a start time and optionally also an end time. The request may also contain how much bandwidth is requested, either in numeral values, e.g. 4 Mbps or 12 Mbps, or in pre-defined categories, e.g. standard definition television or high definition television. Optionally, there is no indication of how much bandwidth is requested, which still can be usable, e.g. in the case where all channels consume approximately the same amount of bandwidth, such as all channels being standard definition channels.

The server then obtains all relevant reservations in an obtain reservation step 81, e.g. from persistent memory, optionally cached in volatile memory. The relevant reservation can be all reservations that at least partly overlap in time with the received bandwidth reservation request.

In a determine acceptable step 82, the server combines the received bandwidth reservation request with the obtained reservations and determines if any part of such a combination exceeds a bandwidth limitation for the restricted channel in question.

Depending on the result of the determination, in the conditional acceptable step 83, if the bandwidth limitation is not exceeded at all, the bandwidth reservation request is deemed acceptable and the method continues to a handle accept step 84. If the bandwidth limit is exceeded for the entire period of the bandwidth reservation request, the method continues to a handle rejection step 86. Optionally, if the bandwidth limit is exceeded only for part of the period of the bandwidth reservation request, the method continues to a handle partial accept step 85.

In the handle accept step 84, an accept response is sent from the server to the receiver, indicating that the request for the bandwidth reservation is accepted. Furthermore, the bandwidth reservation is saved in memory along with any prior bandwidth reservations.

In the handle rejection step 86, a reject response is sent from the server to the receiver indicating that the bandwidth reservation is rejected. It is then not necessary to save the bandwidth reservation in question in the memory.

In the optional handle partial accept step 85, a message indicating that a partial accept response is sent from the server to the receiver with information about for what times the bandwidth reservation request could be accepted. The receiver can then either respond by agreeing with the times that are found to be within the bandwidth limit, or it can perform more detailed processing with the user, e.g. allowing the user to delete or modify other bandwidth reservations. If the handle partial accept step is not present, a partial accept would be handled as a rejection, since it can not be accepted due to at least part of the reservation would result in the bandwidth limit being exceeded.

The above described method can be executed as software instructions in a server, such as the application server 1 or the policy server 2.

Figure 6:
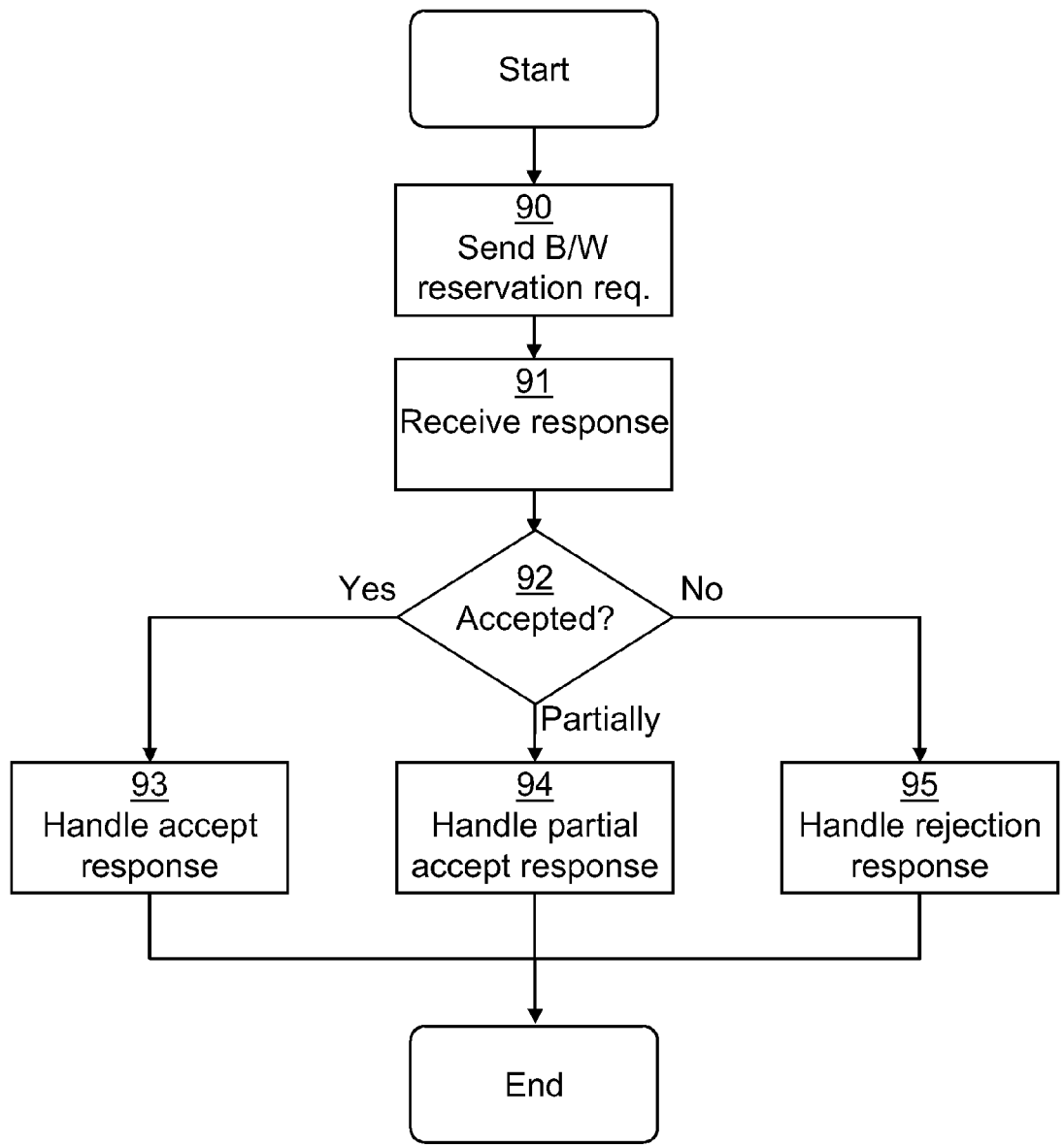
FIG. 6 is a flow chart illustrating a method in the receiver, where the method is arranged to interact with the method illustrated by the flow chart of FIG. 5.

FIG. 6 is a flow chart illustrating a method in the receiver, where the method is arranged to interact with the method illustrated by the flow chart of FIG. 5.

In an initial send bandwidth reservation request step 90, the receiver sends a bandwidth reservation request to the server. As explained above, the bandwidth reservation comprises at least a start time and optionally an end time. Optionally, requested bandwidth is included, either as numerical data or as category data.

In a receive response step 91, a bandwidth reservation response is received in the receiver from the server.

It is then determined what type of response was received in the conditional accepted step 92. If the bandwidth reservation response indicated that the request was accepted, the method continues to a handle accept response step 93. If the bandwidth reservation response indicated that the request was rejected, the method continues to a handle rejection response step 95. Optionally, if the bandwidth reservation response indicates that the request was partially accepted, the method continues to the a handle partial accept response step 94.

In the handle accept response step 93, the receiver acts on the accept response. For example, if the bandwidth reservation concerns live television viewing, the receiver starts to show the live television to the user in question, as is known in the art per se, e.g. using IPTV. If the bandwidth reservation concerns a PVR recording, the receiver schedules the recording as is known in the art per se.

In the handle rejections response step 95, the receiver acts on the rejection response. The user action that triggered the bandwidth reservation request is thus rejected. For example, if the user action would be to watch live television, this is rejected, or if the user action would be to schedule a PVR recording, the scheduling is rejected. Optionally, the rejection response triggers the receiver to provide a user interface giving the user opportunity to reschedule or delete one or more of the existing reservations to free up bandwidth for the desired user action which was the reason for the original bandwidth reservation request that was sent in step 90 above.

In the handle partial accept response step 94, the device acts on the partial accept response. The receiver can then either send a message back to the server agreeing with the times that are found to be within the bandwidth limit, or it can perform more detailed processing with the user, e.g. allowing the user to delete or modify other bandwidth reservations.

It is to be noted that the method of FIG. 6 can be implemented using software instructions executed in a controller of the receiver 22, 10-13.

Figure 7:
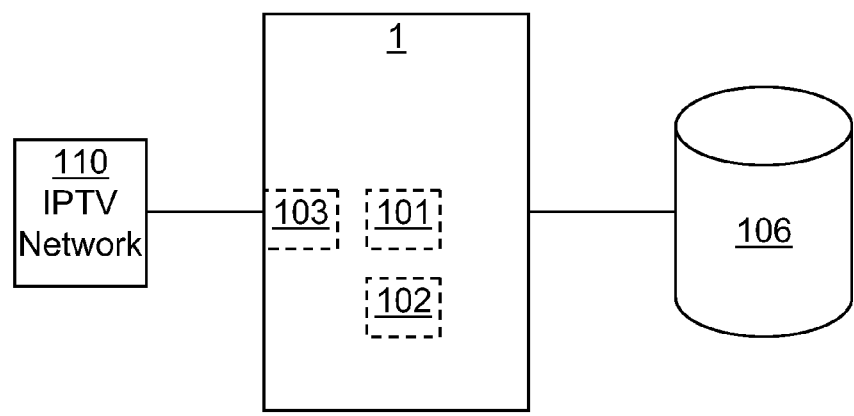
FIG. 7 is a schematic diagram showing components of an embodiment of the application server 1 of FIG. 1.

FIG. 7 shows components of an embodiment of the application server 1 of FIG. 1. The application server comprises a controller 101, internal memory 102, and a network interface 110. The controller can be any suitable central processing unit (CPU), digital signal processor (DSP), etc., capable of executing software instructions stored in the internal memory 102. The internal memory can be any combination of read and write memory (RAM) and read only memory (ROM). The network interface allows the application server connect to the IPTV network 110, e.g. to communicate with the receivers 10-13. Persistent storage 106 is also provided, e.g. for storing bandwidth reservations. The persistent memory can be any single one or combination of magnetic memory, optical memory, or solid state memory. Optionally, a user interface is provided (not shown) for operator usage. Alternatively, the server can be operated remotely or locally using the network interface 103.

The hardware implementation of the policy server 2 can be similar to the application server 1.

Figure 8:
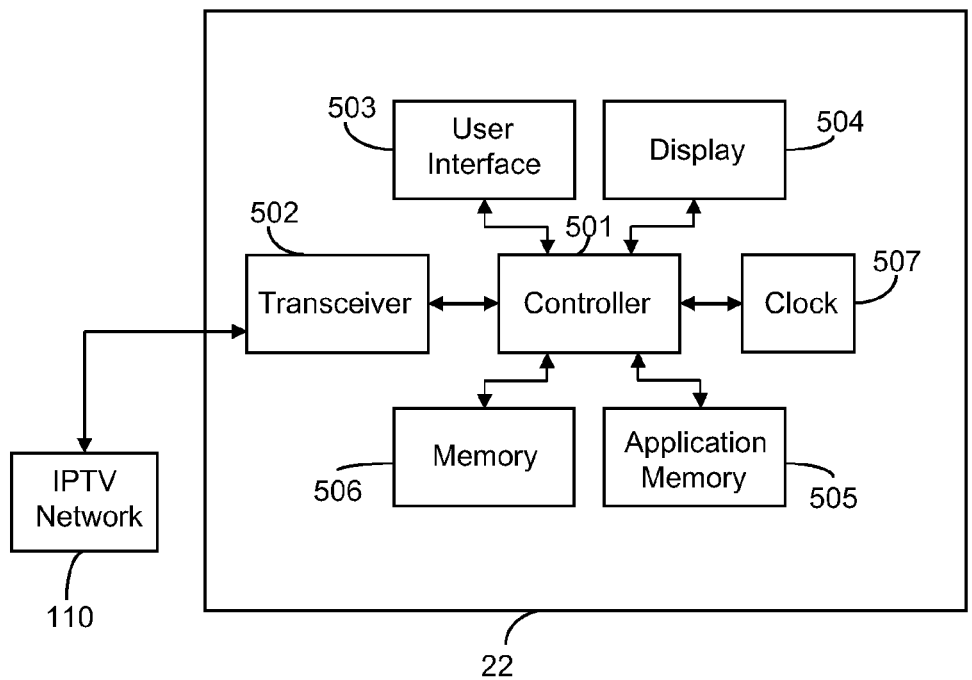
FIG. 8 is a schematic diagram showing components of an embodiment of the receiver of FIG. 1.

The receiver 22 of FIG. 8 comprises a controller 501, which may include one or more sub-processors, and which is configured to manage one or more software modules and/or applications, in order for the receiver to be able to carry out the operations and procedures described above, as well as any other conventional operations, which typically are run on the proposed type of communication entities. The controller can be a central processing unit (CPU), digital signal processor (DSP) or any other logic device capable of executing software instructions.

The receiver 22 comprises a transceiver 502 that is suitable for exchanging information with one or more network entities, represented by IPTV network 110. The transceiver can receive content, such as video and audio content, and is capable of sending messages, e.g. control messages such as bandwidth reservation request messages, upstream in the network, e.g. to the application server 1.

User input can be provided to the receiver 22 via a User Interface (UI) 503, which is optionally integrated with the receiver 22, and/or configured as a part of a separate entity, e.g. a remote control. The receiver 22 also comprises one or more displays 504 for presenting information associated with IPTV setup, as well as IPTV media content, to an end-user. In the case where there are two displays, one display can be the main content view display, e.g. a connected television set, and the other display can be a more rudimentary light emitting diode (LED) display provided on the receiver itself. Alternatively, if the receiver 22 has touch-screen capabilities, the display 504 may be configured as a display that is integrated with the user interface 503.

Software applications of the receiver 22 are typically stored in an application memory 505, and information, such as e.g. broadcast offerings, may be downloaded and/or cached in, and later retrieved from, a separate memory 506. Optionally the receiver 22 includes PVR functionality, wherein the memory 506 is large enough to store significant amounts of video and audio data. The memory 506 can then be any one or a combination of magnetic memory, optical memory and solid state memory. The software for performing the PVR functionality is stored in the application memory 505. The application memory 505 optionally contains user agent applications such as a web browser, a Adobe flash browser, etc, supporting a thin client interface to the application server 1. Optionally, the application memory 505 contains an application being a thick client for interfacing with the application server 1.

Finally, the receiver 22 also comprises a clock 507, that is adapted to trigger applications to run at a specific time, e.g. to start a PVR recording.

Optionally, the receiver 22 is comprised in a larger entity, such as a television or a general purpose computer. In these cases, some or all components described above may be part of the larger entity, whereby such components are not solely provided for the use of the receiver 22. The receiver can also be comprised in a mobile terminal, as long as the mobile terminal utilises the restricted channel, e.g. by connecting to a home network via a wireless local area network connection, e.g. using any of the IEEE 802.11 standards.

Figure 9:
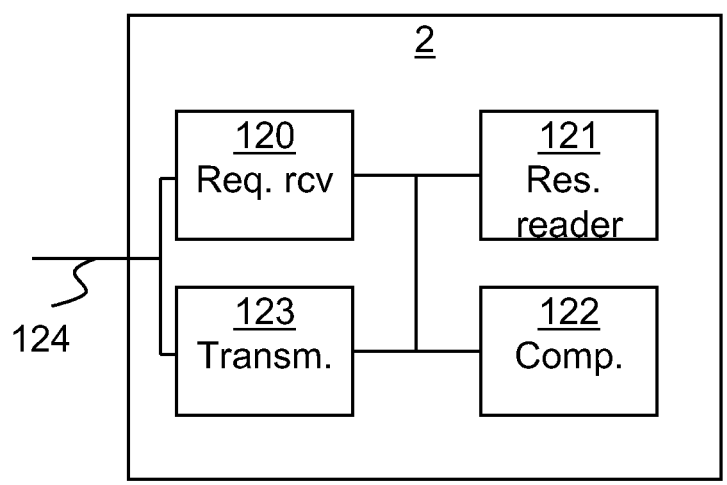
FIG. 9 shows modules of an embodiment of the application server of FIG. 1.

FIG. 9 shows modules 120-122 of an embodiment of the policy server 2 of FIG. 1. The modules 120-122 can be implemented using software and/or hardware. It is also to be noted that the modules may share some hardware components such as controllers and memory. A request receiver 120 is configured to receive a bandwidth reservation request over a connection 124 to reserve bandwidth on a restricted channel. The bandwidth reservation request comprises a reservation start time. A reservation reader 121 is configured to read any existing bandwidth reservations for bandwidth on the restricted channel at least partly covered by the duration of the reservation request, e.g. from the memory 106 of FIG. 7. A comparator 122 is configured to determine whether a bandwidth limit (e.g. limit 59 of FIGS. 3a-3d) is exceeded by a combination of the bandwidth reservation request and the any existing bandwidth reservations, at any time covered by the bandwidth reservation request. Finally, a transmitter 123 configured to send a reservation accept response over the connection 124 when it is determined that the combination is under the bandwidth limit, and to send a reservation reject response when it is determined that the combination exceeds the bandwidth limit. The connection 124 is for example a connection to the application server 1 and/or receivers 10-13, 22.

Figure 10:
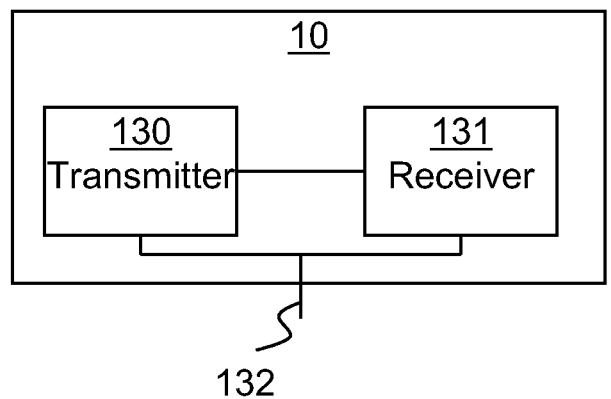
FIG. 10 shows modules of an embodiment of the receiver 10 (or 11-13) of FIG. 1.

FIG. 10 shows modules 130-131 of an embodiment of the receiver 10 (or 11-13) of FIG. 1. The modules 130-131 can be implemented using software and/or hardware. It is also to be noted that the modules may share some physical hardware components such as controllers and memory. A transmitter 130 is configured to send a bandwidth reservation request over a connection 132 to reserve bandwidth on a restricted channel, where the bandwidth reservation request comprises a reservation start time. A response receiver 131 is configured to receive a reservation accept response over the connection 132 from the application server when it is determined that the bandwidth combination is under the bandwidth limit, and to receive a reservation reject response when it is determined that the combination exceeds the bandwidth limit. The connection 132 is for example a connection to the application server 1 and/or the policy server 2.

While the embodiments above are disclosed as reducing bandwidth congestion issues in the first mile, the invention is equally applicable to any congestion point in the network. Additionally, several congestion points along a content delivery path can each be managed according to what is described above to allow concurrent bandwidth reservations for a plurality of congestion points at different hierarchical levels in the delivery network.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for bandwidth allocation in a bandwidth allocation server of a digital video network, the digital video network comprising a restricted channel that is a link between a subscriber location and an access node, the method comprising:
   receiving a bandwidth reservation request that requests reservation of bandwidth on the restricted channel and that includes a future reservation start time delimiting the duration for which reservation is requested;
   obtaining any existing bandwidth reservations that have already reserved bandwidth on the restricted channel during at least part of said duration;
   determining whether a bandwidth limit would be exceeded by a combination of the requested bandwidth reservation and the existing bandwidth reservations, during any part of said duration;
   when it is determined that the combination would not exceed the bandwidth limit during any part of said duration, accepting the request by sending a reservation accept response and storing a reservation corresponding to the request; and
   when it is determined that the combination would exceed the bandwidth limit during the entirety of said duration, rejecting the request by sending a reservation reject response.

2. The method according to claim 1, wherein the request further includes a reservation end time.

3. The method according to claim 1, wherein the bandwidth limit is a bandwidth limit for internet protocol television.

4. The method according to claim 1, wherein the bandwidth limit is a bandwidth limit for a single internet protocol television subscriber.

5. The method according to claim 1, wherein the reservation reject response contains references to at least one of the existing bandwidth reservations.

6. The method according to claim 1, further comprising, when it is determined that the combination would exceed the bandwidth limit during only part of said duration, partially accepting the request by sending a partial reservation accept response that includes at least one time interval during which the combination would be under the bandwidth limit.

7. The method according to claim 6, wherein the partial accept response contains references to at least one of the existing bandwidth reservations.

8. The method according to claim 1, wherein the bandwidth reservation request includes a numerical value indicating the requested bandwidth.

9. A bandwidth allocation server configured to allocate bandwidth in a digital video network, the digital video network comprising a restricted channel that is a link between a subscriber location and an access node, the bandwidth allocation server comprising:
- a request receiver configured to receive a bandwidth reservation request that requests reservation of bandwidth on the restricted channel and that includes a future reservation start time delimiting the duration for which reservation is requested;
- a reservation reader configured to read any existing bandwidth reservations that have already reserved bandwidth on the restricted channel during at least part of said duration;
- a comparator configured to determine whether a bandwidth limit would be exceeded by a combination of the requested bandwidth reservation and the existing bandwidth reservations, during any part of said duration; and
- a transmitter configured to send a reservation accept response when it is determined that the combination would not exceed the bandwidth limit during any part of said duration, and to send a reservation reject response when it is determined that the combination would exceed the bandwidth limit during the entirety of said duration.

10. The bandwidth allocation server according to claim 9, wherein:
- the bandwidth allocation server is comprised in a policy server;
- the request receiver is configured to receive the bandwidth reservation request from an application server, the application server being configured to serve requests from receivers; and
- the transmitter is configured to send responses to the application server.

11. The bandwidth allocation server according to claim 9, wherein:
- the bandwidth allocation server is comprised in combined policy and application server, wherein the policy and application server is configured for bandwidth allocation and to serve requests from receivers;
- the request receiver is configured to receive the bandwidth reservation request from a receiver; and
- the transmitter is configured to send responses to the receiver.

12. A method for reserving bandwidth in a digital video network, the digital video network comprising a restricted channel that is a link between a subscriber location and an access node in the digital video network, the method comprising:
- generating a bandwidth reservation request that requests reservation of bandwidth on the restricted channel and that includes a future reservation start time delimiting the duration for which reservation is requested;
- sending the bandwidth reservation request to a bandwidth allocation server;
- receiving a reservation accept response when the bandwidth allocation server determines that a combination of the requested bandwidth reservation and any existing bandwidth reservations would not exceed a bandwidth limit during any part of said duration; and
- receiving a reservation reject response when the bandwidth allocation server determines that the combination would exceed the bandwidth limit during the entirety of said duration.

13. The method according to claim 12, wherein said generating comprises generating the bandwidth reservation request to include a numerical value indicating the requested bandwidth.

14. The method according to claim 12, wherein the reservation reject response contains references to at least one of the existing bandwidth reservations.

15. The method according to claim 12, further comprising receiving a partial reservation accept response when the bandwidth allocation server determines that the combination would exceed the bandwidth limit during only part of said duration, the partial reservation accept response including at least one time interval during which the combination would be under the bandwidth limit.

16. The method according to claim 15, wherein the partial accept response contains references to at least one of the existing bandwidth reservations.

17. The method according to claim 12, wherein said generating comprises generating the bandwidth reservation request responsive to a user switching channels from a television channel with a relatively low bandwidth to a television channel with a relatively high bandwidth.

18. An apparatus for reserving bandwidth in a digital video network, the apparatus comprising:
- one or more processing units configured to generate a bandwidth reservation request that requests reservation of bandwidth on a restricted channel and that includes a future reservation start time delimiting the duration for which reservation is requested;
- a transmitter configured to send the bandwidth reservation request to a bandwidth allocation server; and
- a response receiver configured to:
  - receive a reservation accept response when the bandwidth allocation server determines that a combination of the requested bandwidth reservation and any existing bandwidth reservations would not exceed a bandwidth limit during any part of said duration, and to receive a reservation reject response when the bandwidth allocation server determines that the combination would exceed the bandwidth limit during the entirety of said duration.

19. A set top box comprising an apparatus for reserving bandwidth in a digital video network, the apparatus comprising:
- one or more processing units configured to generate a bandwidth reservation request that requests reservation of bandwidth on a restricted channel and that includes a reservation start time delimiting the duration for which reservation is requested;
- a transmitter configured to send the bandwidth reservation request to a bandwidth allocation server; and
- a response receiver configured to receive a reservation accept response when the bandwidth allocation server determines that a combination of the requested bandwidth reservation and any existing bandwidth reservations would not exceed a bandwidth limit during any part of said duration, and to receive a reservation reject response when the bandwidth allocation server determines that the combination would exceed the bandwidth limit during the entirety of said duration.

20. A television set comprising an apparatus for reserving bandwidth in a digital video network, the apparatus comprising:

one or more processing units configured to generate a bandwidth reservation request that requests reservation of bandwidth on a restricted channel and that includes a reservation start time delimiting the duration for which reservation is requested;

a transmitter configured to send the bandwidth reservation request to a bandwidth allocation server; and a response receiver configured to receive a reservation accept response when the bandwidth allocation server determines that a combination of the requested bandwidth reservation and any existing bandwidth reservations would not exceed a bandwidth limit during any part of said duration, and to receive a reservation reject response when the bandwidth allocation server determines that the combination would exceed the bandwidth limit during the entirety of said duration.

* * * * *